United States Patent [19]

Flamm et al.

[11] E Patent Number: Re. 32,188

[45] Reissued Date of Patent: Jun. 17, 1986

[54] COLOR TELEVISION RECEIVER COMPRISING AT LEAST ONE INTEGRATED CIRCUIT FOR THE LUMINANCE SIGNAL AND THE CHROMINANCE SIGNALS

[75] Inventors: Peter M. Flamm, Freiburg; Leslie Miskin, Gundelfingen, both of Fed. Rep. of Germany

[73] Assignee: ITT Industries, Inc., New York, N.Y.

[21] Appl. No.: 498,029

[22] Filed: May 25, 1983

Related U.S. Patent Documents

Reissue of:

[64] Patent No.: 4,270,139
Issued: May 26, 1981
Appl. No.: 101,657
Filed: Dec. 10, 1979

[30] Foreign Application Priority Data

Dec. 15, 1978 [DE] Fed. Rep. of Germany ..... 2854238

[51] Int. Cl.[4] ..... H04N 9/50
[52] U.S. Cl. ..... 358/23; 358/21 R
[58] Field of Search ..... 358/13, 21 R, 30, 56, 358/59

[56] References Cited

U.S. PATENT DOCUMENTS

| | | | |
|---|---|---|---|
| 3,961,365 | 6/1976 | Payne et al. | 358/59 |
| 4,075,656 | 2/1978 | Beaulier | 358/13 |
| 4,194,215 | 3/1980 | Shionoya | 358/59 |
| 4,251,802 | 2/1981 | Horna | 358/13 |

FOREIGN PATENT DOCUMENTS

| | | |
|---|---|---|
| 2830825 | 1/1980 | Fed. Rep. of Germany . |
| 2349250 | 11/1977 | France . |
| 1251767 | 10/1971 | United Kingdom . |
| 1457107 | 12/1976 | United Kingdom . |
| 1518126 | 7/1978 | United Kingdom . |

OTHER PUBLICATIONS

"Digital Processing Amplifier and Color Encoder", SMPTE Journal Jan. 1978, vol. 87, pp. 15–19.

"An Integrated One-Chip Processor for Color TV Receivers," IEEE Trans. Cons., Electronics, Aug. 1977, pp. 300–310.

"A PAL/YUV Digital System . . . " BBC Research Report RD 1976/24 Sep. 1976.

*Primary Examiner*—Michael A. Masinick
*Attorney, Agent, or Firm*—Donald J. Lenkszus

[57] ABSTRACT

A color television receiver is provided having a fully digital color demodulator wherein the luminance signal and the chrominance signals are separated and digitally processed prior to being converted to analog signals.

23 Claims, 6 Drawing Figures

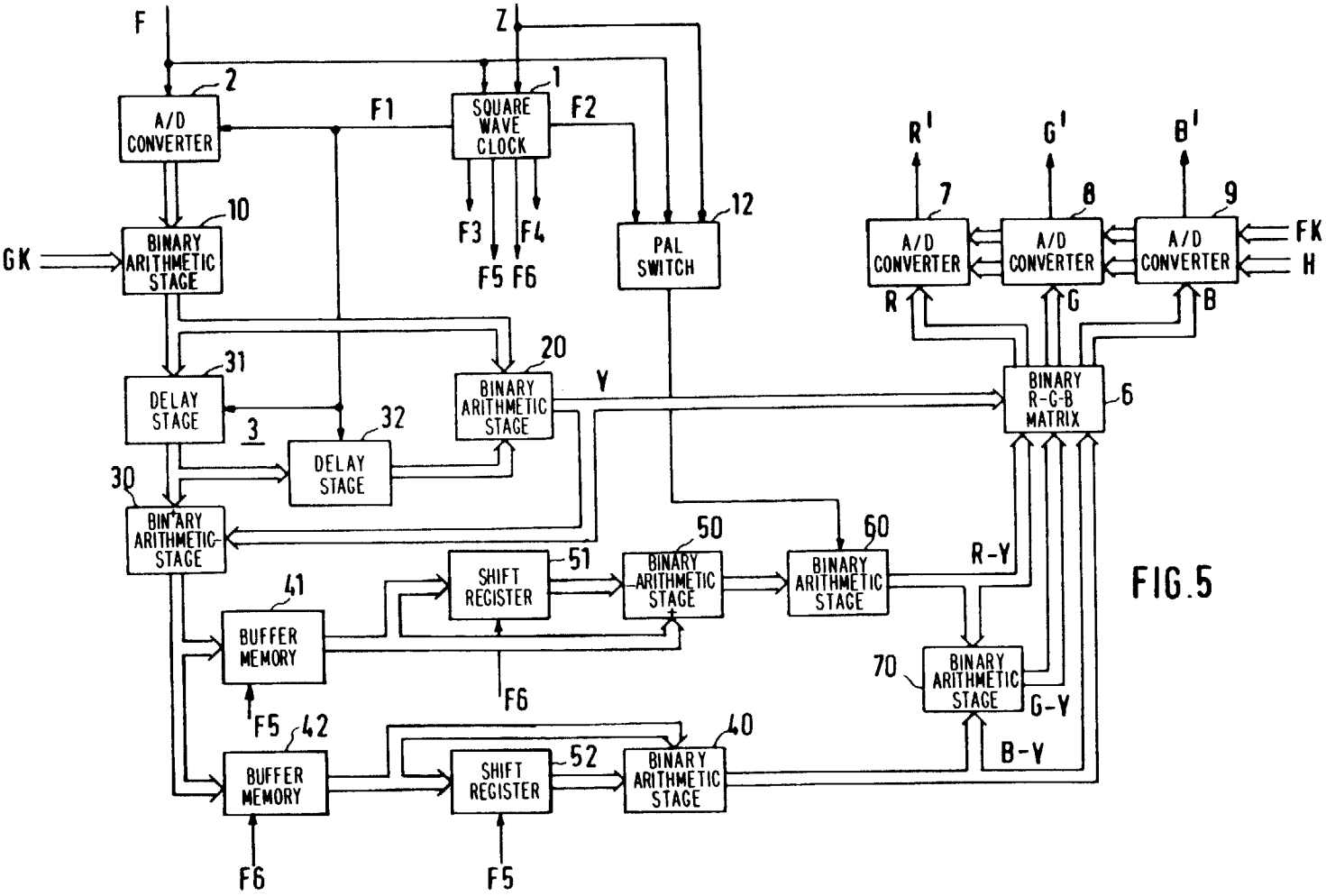
A/D CONVERTER
A/D CONVERTER
A/D CONVERTER
BINARY R-G-B MATRIX
BINARY ARITHMETIC STAGE
BINARY ARITHMETIC STAGE
BINARY ARITHMETIC STAGE
BINARY ARITHMETIC STAGE
BINARY ARITHMETIC STAGE
BINARY ARITHMETIC STAGE
BINARY ARITHMETIC STAGE
PAL SWITCH
SQUARE WAVE CLOCK
A/D CONVERTER
DELAY STAGE
DELAY STAGE
SHIFT REGISTER
SHIFT REGISTER
BUFFER MEMORY
BUFFER MEMORY
FIG. 5

COLOR TELEVISION RECEIVER COMPRISING AT LEAST ONE INTEGRATED CIRCUIT FOR THE LUMINANCE SIGNAL AND THE CHROMINANCE SIGNALS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to color television receivers and, more particularly, to color television receivers having digital luminance and chrominance signals.

2. Description of the Prior Art

In a book by O. Limann, "Fernsehtechnik ohne Ballast", 12th edition, Munchen 1978, pages 189 to 263, the principle and the basic circuits of today's color-television receivers are described. This description includes an explanation of commercially available integrated circuits which can be used in the color portion of a color-television receiver. A characteristic feature of these integrated circuits is that they process the analog composite color signal in analog form. The integrated circuits described are, therefore, circuits implemented with conventional junction transistors, i.e., so-called bipolar integrated circuits.

On the other hand, the above-mentioned book describes, on pages 307 to 326, integrated remote-control arrangements for television receivers which operate essentially digitally and, thus, are implemented using mainly insulated-gate field-effect transistor technology, i.e., so-called MOS technology.

It should be noted that the term "MOS technology", once coined as an abbreviation for "metal oxide silicon" is no longer limited to insulated-gate field-effect transistors having a silicon-dioxide gate insulating layer, because today, use is also made of material other than silicon dioxide, such as silicon nitride or multilayer arrangements of different insulating materials.

Bipolar integrated circuits are mainly suited to analog signal processing, while integrated circuits for digital signal processing can be better implemented using MOS technology. With the development of ever larger integrated circuits, i.e. so-called VLSI (very-large-scale-integrated) circuits, a certain limit has now been reached with bipolar integrated circuits as far as the amount of circuitry capable of being accommodated on a single semiconductor chip is concerned is such circuits are to be fabricated at a warrantable expense (e.g., chip size, yield) by conventional mass-production techniques. In this respect, MOS integrated circuits are better suited for larger-scale integration.

SUMMARY OF THE INVENTION

The object of the invention as characterized in the claims is, in view of the preferred implementation using MOS technology, to provide a concept for a color-television receiver in which the luminance signal and the chrominance signals are separated and conditioned not in analog form as has been done so far, but in digital form.

DESCRIPTION OF THE DRAWINGS

FIG. 5 shows a preferred form of the first embodiment of FIG. 1, which can also be used in the other embodiments of FIGS. 2 to 4.

DESCRIPTION OF THE INVENTION

Figure 1:
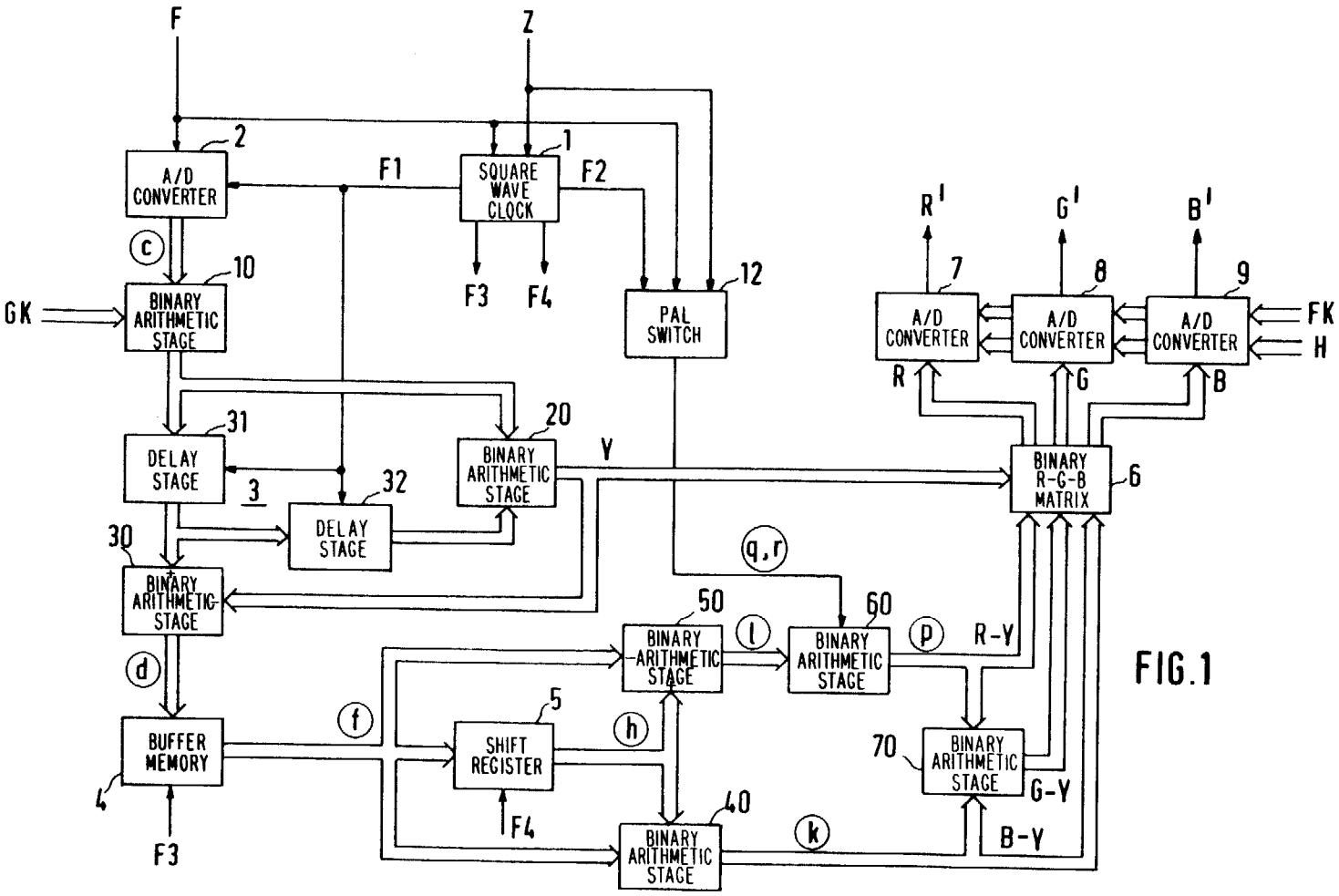
FIG. 1 is a block diagram of a first embodiment of a digital luminance/chrominance portion of a color-television receiver according to the invention.

In the block diagrams shown in FIGS. 1 to 4, like parts are designated by like reference numerals. In addition to interconnections indicated by solid lines as is usual in circuit diagrams, these figures contain interconnections indicated by stripes. These stripes mark connections between digital parallel outputs of the delivering portion of the circuit and digital parallel inputs of the receiving portion. The interconnections indicated by stripes therefore consist of at least as many wires as there are bits in the binary word to be transferred. Thus, the signals transferred over the lines indicated by stripes in FIGS. 1 to 5 are all binary signals whose instantaneous binary value corresponds to the instantaneous analog value of the composite color signal and of other signals.

Like in conventional color-television receivers, the composite color signal F, derived in the usual manner, controls the chrominance-subcarrier oscillator, which, according to the invention, is designed as a square-wave clock generator 1. By means of the so-called burst contained in the composite colour signal F, the clock generator 1 is synchronized to the transmitted chrominance-subcarrier frequency. In the embodiments of FIGS. 1 to 5, the clock generator 1 generates the clock signal F1, whose frequency is four times the chrominance-subcarrier frequency, i.e. about 17.73 MHz (precisely 17.734475 MHz) in the case of the CCIR standard.

The clock generator 1 also generates the square-wave clock signal F2 having the frequency of the chrominance subcarrier. The first and second clock signals F1, F2 have a mark-to-space ratio of 0.5 (cf. FIGS. 6a and 6b). In addition, the clock generator 1 generates the third clock signal F3 and the fourth clock signal F4, each of which consists of two consecutive, T/2-long pulses separated by T/2 within each 4T-long period, where T is the period of the first clock signal F1. The third and fourth clock signals F3, F4 are shown in FIGS. 6b and 6g.

The individual clock signals are generated within the clock generator 1 in the usual manner using conventional digital techniques. The clock signal F1, for instance, may be generated by means of a suitable 17.37 MHz crystal, and the clock signals F2, F3, F4 may be derived therefrom by frequency division and suitable elimination of pulses. Like in conventional color-television receivers, the clock generator 1 is also fed with a pulse Z from the horizontal output stage during which the clock generator 1 is synchronized by the burst.

Figure 6:
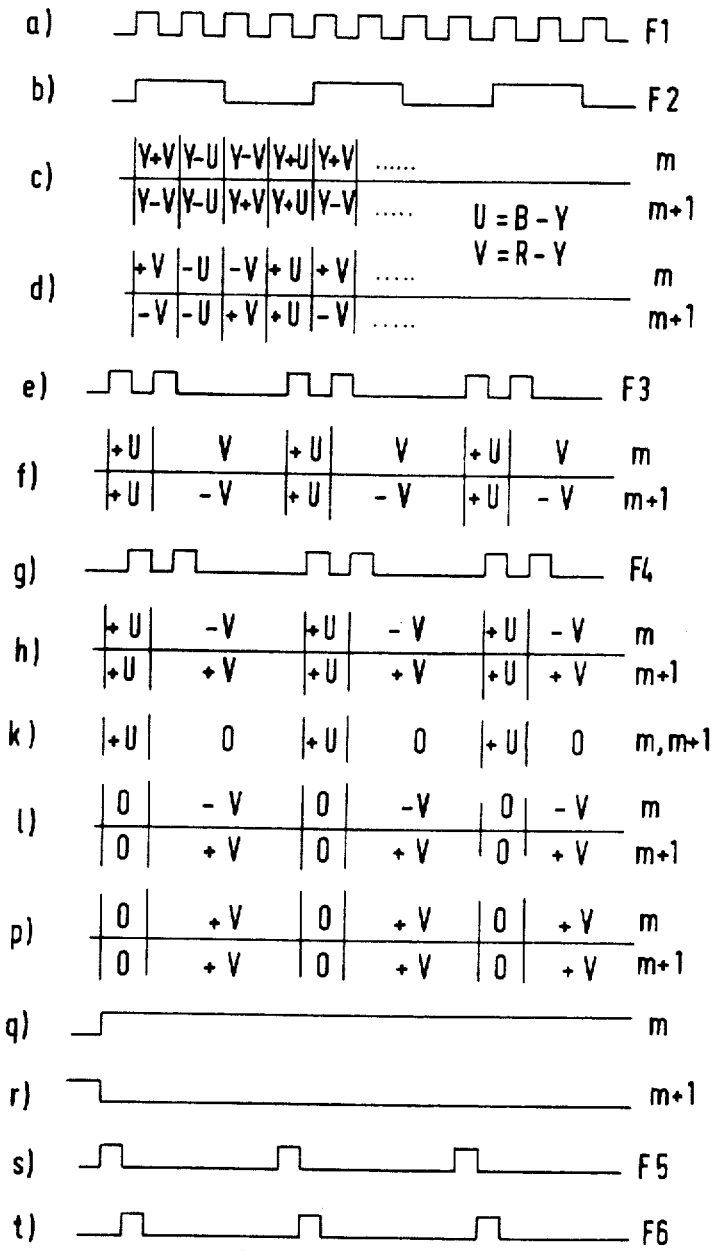
FIG. 6 shows various waveforms in the arrangement of FIG. 1 and, in tabular form, signals occurring at given points at given times.

The composite color signal F is also applied to the analog input of the analog-to-digital converter 2, which is clocked by the first clock signal F1 and, at the beginning of each pulse of the first clock signal F1, forms from the amplitude of this pulse a parallel binary word and delivers it as an output signal. These leading edges of the pulses of the first clock signal F1 thus occur at the instants when the respective amplitudes of the undemodulated chrominance signal contained in the composite color signal are equal to the amplitudes of the respective color-difference signal. These parallel binary words then remain unchanged for the respective period T of the first clock signal F1, i.e., they are held like in a sample-and-hold circuit. The signals appearing at the output of the analog-to-digital converter 2 are given in tabular form in FIG. 6c, where the vertical lines symbolize the respective clock periods of the first clock signal F1. The letter c of FIG. 6 is also shown in FIG. 1 (encircled).

According to FIG. 6c, successive signals Y+V, Y−U, Y−V and Y+U are obtained in a line m during one period of the second clock signal F2, where U, V and Y have the formal meanings given in the abovementioned book, namely U=B−Y, V=R−Y, B=blue chrominance signal, R=red chrominance signal, and Y=luminance signal, but designate here the corresponding digitized signals, i.e., the corresponding binary words. The second line in the Table of FIG. 6c gives the corresponding binary signals in the line m+1, namely the signals Y−V, Y−U and Y+U occurring during that period of the clock signal F2 which is under consideration.

This output signal of the analog-to-digital converter 2 is applied to one of the two inputs of the first binary arithmetic stage 10, which multiplies this output signal by a binary overall-contrast control signal GK. This overall contrast control signal thus corresponds to the analog overall-contrast control signal present in conventional color-television receivers. In present-day color-television receivers, the binary overall-contrast control signal GK, just as the binary color-saturation control signal JF and the binary brightness control signal H to be explained below, is available in digital form, because remote-control units and digital controls are usually present which provide these signals. An advantage of the invention is therefore seen in the fact that these signals need no longer be conditioned in analog form in their place of action.

The output signal of the first binary arithmetic stage 10 is fed to the second binary arithmetic stage 20 and to the two-stage delay line 3, which delays this output signal by T/2. The second binary arithmetic stage 20 forms the arithmetic means of the delayed and undelayed signals. The underlying idea is that if a sinusoidal signal, namely the chrominance subcarrier, is sampled at double frequency, the mean of two successive sample values will always be zero. Thus, by forming the arithmetic means in the second binary arithmetic stage 20, the chrominance subcarrier is suppressed and the luminance signal Y is obtained in digital form.

The output signal of the first binary arithmetic stage 10, delayed in the first stage 31 of the delay line 3 by half the delay provided by this stage, i.e., by T/4, and the output signal of the second binary arithmetic stage 20 are then fed to the third binary arithmetic stage 30, which subtracts the latter signal, i.e., the Y signal, from the former signal. As a result, the output of the third binary arithmetic stage 30 provides the color-difference signal, made up of the successive components B−Y, R−Y, −(B−Y) and −(R−Y), as shown in FIG. 6d in tabular form for the lines m and m+1.

These signals are fed to the buffer-memory arrangement 4, whose enable input is fed with the third clock signal F3, which is shown in FIG. 6e. This buffer memory operates in such a manner that the binary word fed to the input at the beginning of each pulse of the third clock signal F3 appears at the output when the next clock pulse occurs. Thus, the instantaneous output signals given in FIG. 6f in tabular form for the lines m and m+1 are obtained. The individual stages of the buffer-memory arrangement may be so-called D flip-flops, for example.

The output signal of the buffer-memory arrangement 4 is applied to the shift-register arrangement 5, which consists of n parallel shift registers, where n is the number of bits at the output of the third binary arithmetic stage 30. The delay provided by the n parallel shift registers is equal to the duration of one line, i.e., 64 μs in the case of PAL television sets. The clock inputs of the parallel shift registers are fed with the fourth clock signal F4, which is shown in FIG. 6g. The output signal of the shift-register arrangement is given in tabular form in FIG. 6h for the lines m and m+1.

This output signal, together with the input signal of the shift-register arrangement 5, is fed to the fourth binary arithmetic stage 40, which forms the arithmetic mean of the two signals, so that its output provides the signal B−Y is digital form, which is given in tabular form in FIG. 6k. The input and output signals of the shift-register arrangement 5 are also fed to the fifth binary arithmetic stage 50, which subtracts the input signal from the output signal and divides the difference by two. By the division, a sort of averaging is performed as well.

The output signal of the fifth binary arithmetic stage 50 is given in tabular form in FIG. 6l, again for the lines m and m+1. This output signal is fed to the sixth binary arithmetic stage 60, which, in response to the output signal of the PAL switch 12, leaves it unchanged in one line and forms its absolute value in the other. "To form the absolute value" is used here first of all in the mathematical sense, i.e., the negative sign of a negative number is suppressed and only the positive value of this negative number is taken into account. Within the scope of the present invention, however, "absolute value" also means "value with respect to a constant number". By this it is meant that for a number A below the constant X, the "absolute value with respect to X" is 2X-A. Thus, for the number 30, the "absolute value with respect to 50" is 70. The output of the sixth binary arithmetic stage 60 thus provides the PAL-compensated signal R−Y in digital form, i.e., the red color-difference signal, which is given in tabular form in FIG. 6p for the lines m and m+1.

The output signals of the fourth binary arithmetic stage 40 and of the sixth binary arithmetic stage 60 are fed to the seventh binary arithmetic stage 70, which forms the green color-difference signal G−Y by the well-known formula Y=0.3R+0.59G+0.11B. The subcircuits 5, 40, 50, 60 and 70, together with the PAL switch 12, represent the portion for correcting the phase of the received signal by the PAL method.

The output signals of the second, fourth, sixth and seventh binary arithmetic stages 20, 40, 60, 70, i.e., the luminance signal Y and the color-difference signals B−Y, R−Y and G−Y, are then fed to the binary R-G-B matrix 6, which forms therefrom the binary chrominance signals R, G, B by the above formula. Each of these binary chrominance signals is then fed to one of the three digial-to-analog converters 7, 8, 9, which convert the binary chrominance signals to the analog chrominance signals R', G', B' necessary for R-G-B control of the picture tube.

In the embodiment of FIG. 1, each of these digital-to-analog converters is also fed with the color-saturation control signal FK and the brightness control signal H, both in binary form.

The PAL switch 12 is fed with the second clock signal F2, i.e., a signal having the chrominance-subcarrier frequency locked to the burst, with the composite color signal F, and with the reference pulse Z from the horizontal output stage.

Figure 2:
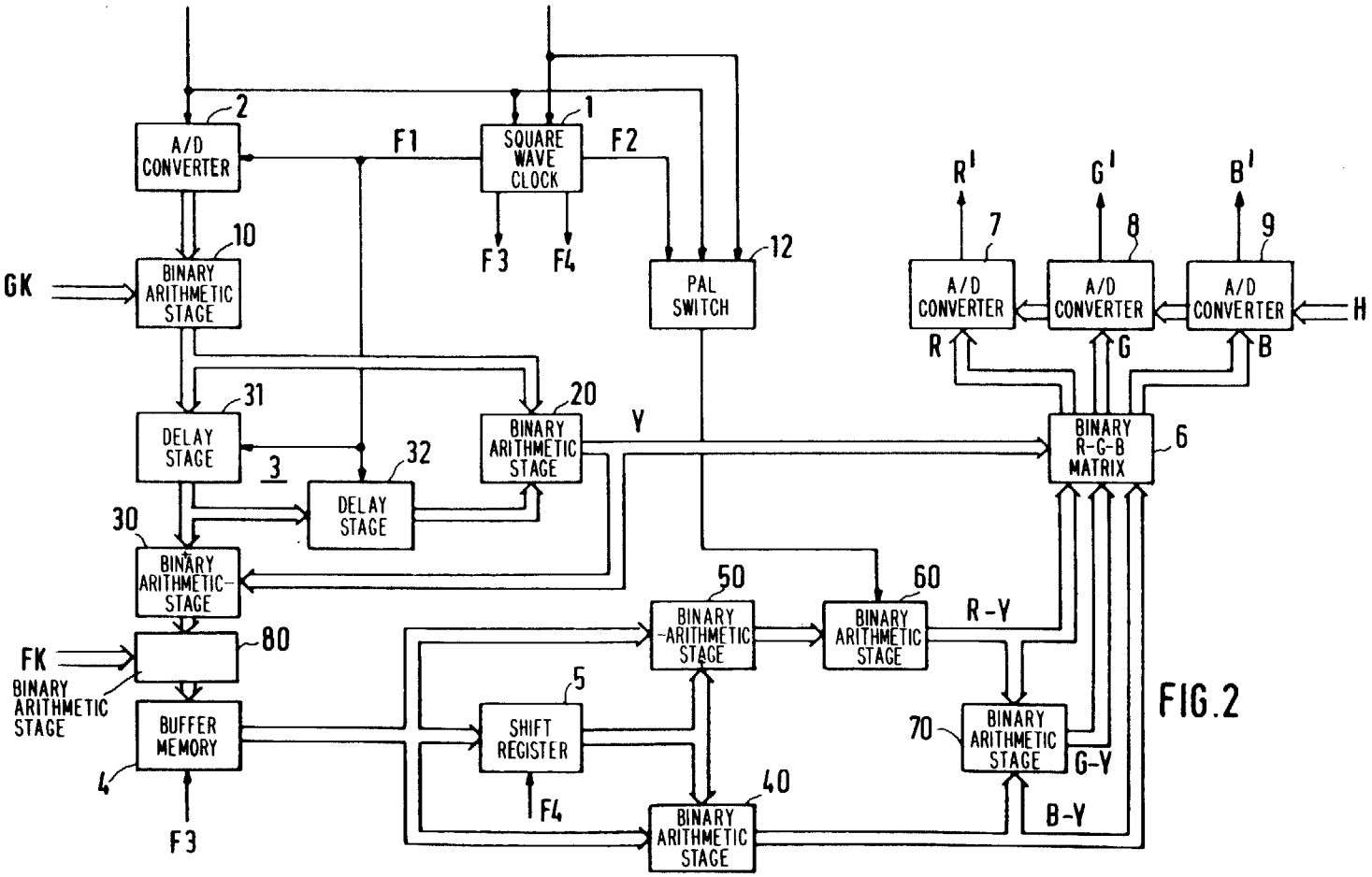
FIG. 2 shows a modification of the embodiment of FIG. 2.

The embodiment of FIG. 2 is a modification of the embodiment of FIG. 1 in which the binary color-saturation control signal FK is fed into the overall circuit at a different point. This point lies between the output of the third binary arithmetic stage 30 and the input of the buffer-memory arrangement 4, where the eighth binary arithmetic stage 80 is inserted, which multiplies the utput signal of the third binary arithmetic stage 30 by the binary color-saturation control signal FK. Thus, in the embodiment of FIG. 2, only the brighness control signal H is applied to the three digital-to-analog converters 7, 8, 9.

Figure 3:
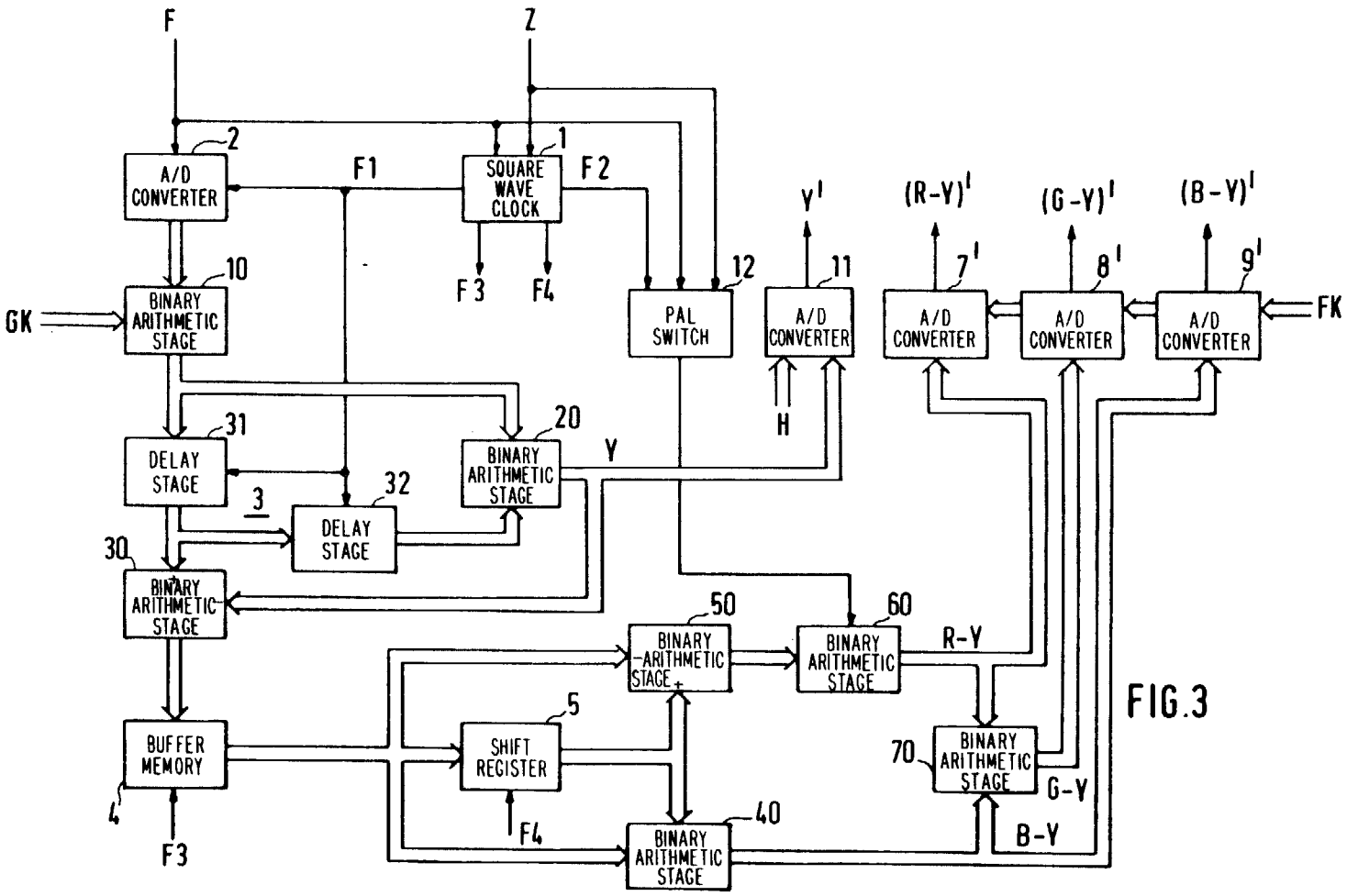
FIG. 3 shows a second embodiment of a luminance/-chrominance portion of a color-television receiver according to the invention.

The embodiment of FIG. 3 shows the conditioning of the color-difference signals and of the luminance signal if the color-television receiver according to the invention contains colour difference control circuitry for the picture tube rather than R-G-B control circuitry as in the embodiments of FIGS. 1 and 2. In such case, the R-G-B matix 6 is not present, but the color-difference signals at the outputs of the fourth, sixth and seventh binary arithmetic stages 40, 60, 70 as well as the luminance signal Y at the output of the second binary arithmetic stage 20 are each fed to one of four digital-to-analog converters, the luminance signal Y being fed to the analog-to-digital converter 11, and the color-difference signals R−Y, G−Y and B−Y to the converters 7', 8' and 9', respectively. In the embodiment of FIG. 3, the brightness control signal H is fed to the digital-to-analog converter 11, which is associated with the luminance channel, while the color-saturation control signal FK is applied to the remaining three digital-to-analog converters 7', 8', 9'. The outputs of these digital-to-analog converters thus provide the analog luminance signal Y' and the analog color-difference signals (R−Y)', (G−Y)', (B−Y)'.

Figure 4:
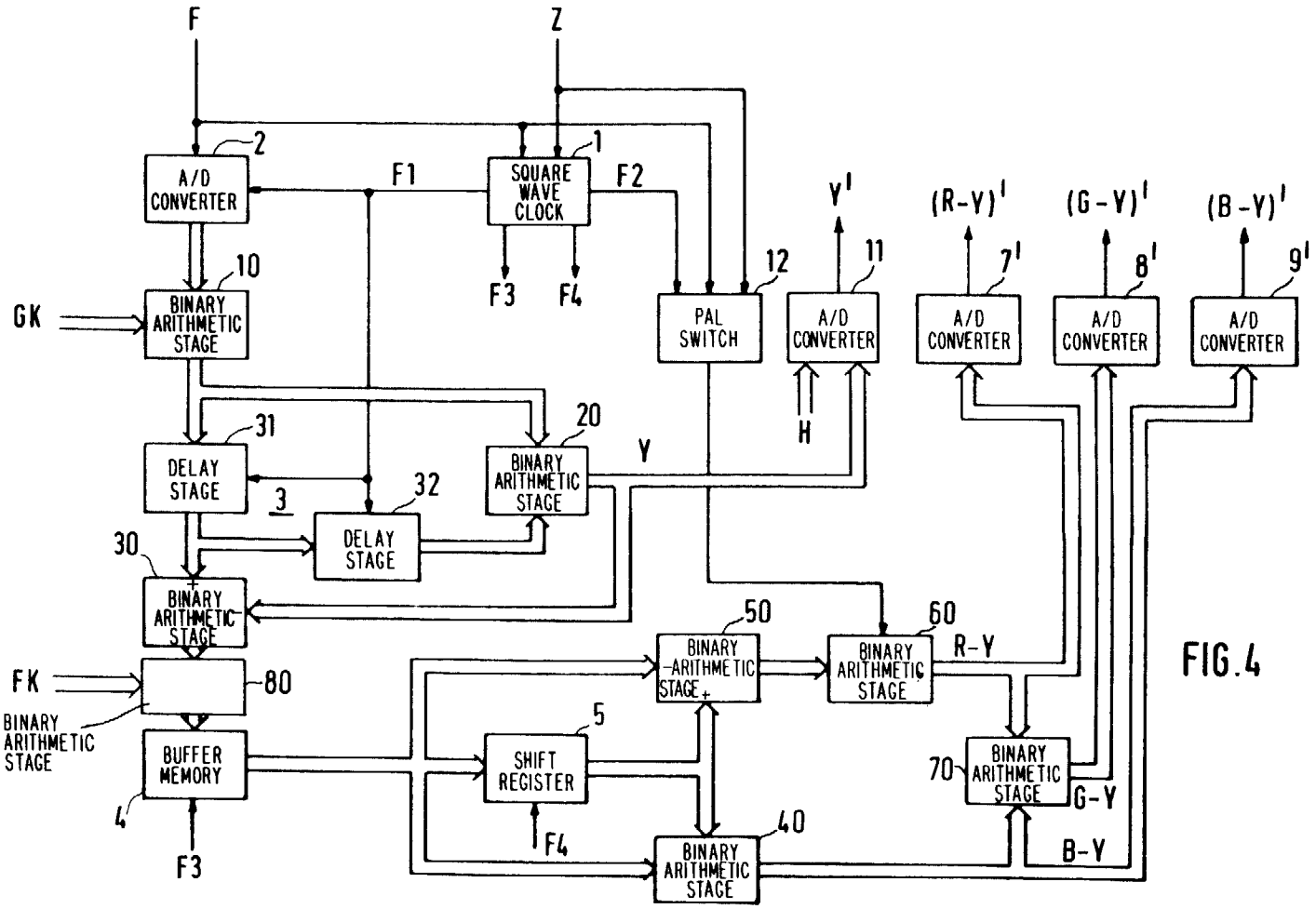
FIG. 4 shows a modification of the second embodiment of FIG. 3 which corresponds to FIG. 2.

The embodiment of FIG. 4 shows that, in the arrangement of FIG. 1, in the same manner as in the embodiment of FIG. 2, the binary color-saturation control signal FK can be applied between the output of the third binary arithmetic stage 30 and the input of the buffer-memory arrangement 4 via the eighth binary arithmetic stage 80. Accordingly, each of the three digital-to-analog converters 7', 8', 9' has only one input for the respective color-difference signal.

FIG. 5 shows a preferred embodiment which can be used both with the R-G-B control of FIGS. 1 and 2 and with the color-difference control of FIGS. 3 and 4. The clock generator, designated here 1', generates two additional clock signals F5, F6. Both the buffer-memory arrangement and the shift-register arrangement are divided into two parts. The buffer-memory arrangement consists of the two buffer memories 41, 42, which are operated in parallel at the input ends, with the clock signal F5 applied to the first buffer memory 41, and the clock signal F6 to the second buffer memory 42. These two clock signals are shown in FIGS. 6s and 6t and are formed in the clock generator 1' by eliminating every second pulse of each period of the third and fourth clock signals F3, F4.

The output signal of the first buffer memory 41 is fed to the first shift-register subarrangement 51, which again consists of n parallel shift registers providing a delay of one line period. Similarly, the output signal of the second buffer memory 42 is applied to the input of the second shift-register subarrangement 52, which also consists of n parallel shift registers providing a delay of one line period. The clock inputs of the shift registers of the first shift-register subarrangement 51 are fed with the sixth clock signal F6, and those of the second shift-register subarrangement 52 with the fifth clock signal F5.

In the embodiment of FIG. 5, the fourth binary arithmetic stage 40 forms the arithmetic mean of the input and output signals of the second shift-register subarrangement 52, while the fifth binary arithmetic stage 50 subtracts the output signal of the shift-register subarrangement 51 from the input signal of this arrangement and divides the difference by two. The further signal processing then corresponds to that in the abovedescribed embodiments with the variants given there for the application of the color-saturation control signal FK and of the brightness control signal H.

While the invention has been described as applied to a PAL-standard color-television receiver, it is readily possible to apply the fundamental idea of the invention to NTSC-standard color-television receivers. To do this, in the embodiment of FIG. 5, for example, it is only necessary to omit the two shift-register subarrangements 51, 52, the fourth, fifth, and sixth arithmetic stages 40, 50, 60 and, of course, the PAL switch 12. The input signals of the seventh binary arithmetic stage 70 are then the two output signals of the two buffer memories 41, 42.

Because of the digital signal processing used in the invention, the sequence of steps in demodulating the composite color-signal differs considerably from that for analog signal processing. For example, part of the synchronous-demodulator function is already implemented by the analog-to-digital converter 2 and by the application thereto of the clock signal F1 having four times the chrominance-subcarrier frequency.

The binary arithmetic stages 10 . . . 80 are characterized by simple arithmetic operations, namely subtraction (in stages 30 and 50) multiplication (in stages 10 and 80), division by two (in stage 50), averaging (in stages 20 and 40), absolute-value formation (in stage 60), and calculation based on a given linear dependence (in stage 70). Implementation of these operations and subcircuits suitable therefor are known from data processing and computer systems and, therefore, need not be explained here in detail.

What is claimed is:

1. A color-television receiver, comprising:

at least one integrated circuit for separating and conditioning the luminance signal and the chrominance signals from the composite color signal, said integrated circuit including a chrominance-subcarrier oscillator, a chrominance-subcarrier band-pass filter, a synchronous demodulator, a PAL switch, a color matrix and an R-G-B matrix, said chrominance-subcarrier oscillator is a square-wave clock generator providing four clock signals, the first of which has four times the chrominance-subcarrier frequency, and the second to fourth of which have the chrominance-subcarrier frequency with the first and second clock signals having a mark-to-space ratio of 0.5, and the third and fourth clock signals each consisting of two consecutive, T/2-long pulses separated by T/2 within each 4T-long period (T=period of the first clock signal);

an analog-to-digital converter clocked by the first clock signal, whose analog input is presented with the composite color signal, and which forms as its output signal a parallel binary word from the amplitude of the composite color signal at those instants where the respective amplitudes of the undemodulated chrominance signal are equal to the amplitudes of the respective color-difference signal;

a first binary arithmetic stage which multiples the output signal of the analog-to-digital converter by a binary overall-contrast control signal;

a two-stage delay line which delays the output signal of the first binary arithmetic stage by T/2;

a second binary arithmetic stage which forms the arithmetic means of the delayed and undelayed output signals of the first binary arithmetic stage;

a third binary arithmetic stage which subtracts the output signal of the second binary arithmetic stage from the output signal of the first delay stage;

a buffer-memory arrangement which temporarily stores the output signal of the third binary arithmetic stage and whose enable input is fed with the third clock signal;

a shift-register arrangement consisting of n parallel shift registers (n=number of bits at the output of the third binary arithmetic stage) each of which provides a delay of one line period and whose serial inputs are connected to the parallel outputs of the buffer-memory arrangement while their clock inputs are fed with the fourth clock signal;

a fourth binary arithmetic stage which forms the arithmetic mean of the input and output signals of the shift-register arrangement;

a fifth binary arithmetic stage which subtracts the input signal of the shift-register arrangement from the output signal of this arrangement and then divides the difference obtained by two;

a sixth binary arithmetic stage which, controlled by the PAL switch, either leaves the output signal of the fifth binary arithmetic stage unchanged or forms its absolute value; and a seventh binary arithmetic stage which forms the green color-difference signal from the output signals of the fourth and sixth binary arithmetic stages, the outputs of the second, fourth, sixth and seventh binary arithmetic stages are connected to the binary R-G-B matrix, each of whose outputs is coupled to one of three digital-to-analog converters for deriving the analog signals for controlling the R-G-B values of the picture tube.

2. A color-television receiver as claimed in claim 1, wherein the square-wave clock generator generates, in addition, a fifth and a sixth clock signal which are formed from the third clock signal and the fourth clock signal respectively, by eliminating every second pulse of each period, the buffer-memory arrangement consists of two buffer memories which are operated in parallel at their inputs, and whose enable inputs are fed with the fifth clock signal and the sixth clock signal, respectively, the shift-register arrangement consists of two shift-register subarrangements each of which has n parallel shift registers providing a delay of one line period, the series inputs of the first shift-register subarrangement are connected to the outputs of the first buffer memory, and the clock inputs of this subarrangement are fed with the sixth clock signal, the serial inputs of the second shift-register subarrangement are connected to the outputs of the second buffer memory, and the clock inputs of this subarrangement are fed with the fifth clock signal, the fourth binary arithmetic stage forms the means of the input signals and the output signals of the second shift-register subarrangement, and the fifth binary arithmetic stage subtracts the input signals of the first shift-register subarrangement from the output signals of this subarrangement.

3. A color-television receiver as claimed in claim 1 incorporating R-G-B control of the picture tube, wherein the three digital-to-analog converters associated with the binary R-G-B matrix are fed with a binary color-saturation control signal and the three digital-to-analog converters are fed with a binary brightness control signal.

4. A color-television receiver as claimed in claim 1 and incorporating color-difference control of the picture tube wherein the digital-to-analog converter associated with the second binary arithmetic stage is fed with a binary brightness control signal and the other three digital-to-analog converters are fed with a binary color-saturation control signal.

5. A color-television receiver as claimed in claim 1 and incorporating color-difference control of the picture tube wherein an eighth binary arithmetic stage multiplying the output signal of the third binary arithmetic stage by a binary color-saturation control signal is connected between the outputs of the third binary arithmetic stage and the parallel inputs of the buffer-memory arrangement.

6. A color-television receiver, comprising:

at least one integrated circuit for separating and conditioning the luminance signal and the chrominance signals from the composite color signal, said integrated circuit including a chrominance-subcarrier oscillator, a chrominance-subcarrier band-pass filter, a synchronous demodulator, a PAL switch, a color matrix, said chrominance-subcarrier oscillator is a square-wave clock generator providing four clock signals, the first of which has four times the chrominance-subcarrier frequency, and the second to fourth of which have the chrominance-subcarrier frequency, with the first and second clock signals having a mark-to-space ratio of 0.5, and the third and fourth clock signal each consisting of two consecutive, T/2 long pulses separated by T/2 within each 4T-long period (T=period of the first clock signal);

an analog-to-digital converter clocked by the first clock signal, whose analog input is presented with the composite color signal, and which forms as its output signal a parallel binary word from the amplitude of the composite color signal at those instants where the respective amplitudes of the undemodulated chrominance signal are equal to the amplitudes of the respective color-difference signal;

a first binary arithmetic stage which multiplies the output signal of the analog-to-digital converter by a binary overall-contrast control signal;

a two-state delay line which delays the output signal of the first binary arithmetic stage by T/2;

a second binary arithmetic stage which forms the arithmetic means of the delayed and undelayed output signals of the first binary arithmetic stage;

a third binary arithmetic stage which subtracts the output signal of the second binary arithmetic stage from the output signal of the first delay stage;

a buffer-memory arrangement which temporarily stores the output signal of the third binary arithmetic stage, and whose enable input is fed with the third clock signal;

a shift-register arrangement consisting of n parallel shift registers (n=number of bits at the output of the third binary arithmetic stage) each of which provides a delay of one line period and whose serial inputs are connected to the parallel outputs of the buffer-memory arrangement while their clock inputs are fed with the fourth clock signal;

a fourth binary arithmetic stage which forms the arithmetic mean of the input and the output signals of the shift-register arrangement;

a fifth binary arithmetic stage which subtracts the input signal of the shift-register arrangement from the output signal of this arrangement and then divides the difference obtained by two;

a sixth binary arithmetic stage which, controlled by the PAL switch, either leaves the output signal of the fifth binary arithmetic stage unchanged or forms its absolute value; and a seventh binary arithmetic stage which forms the green color-difference signal from the output signals of the fourth and sixth binary arithmetic stages, the outputs of the second, fourth, sixth and seventh binary arithmetic stages are each connected to one of four digital-to-analog converters for deriving the analog signals for controlling the color-difference values of the picture tube.

7. A color-television receiver as claimed in claim 6, wherein the square-wave clock generator generates, an addition, a fifth and a sixth clock signal which are formed from the third clock signal and the fourth clock signal, respectively, by eliminating every second pulse of each period, the buffer-memory arrangement consists of two buffer memories which are operated in parallel at their inputs, and whose enable inputs are fed with the fifth clock signal and the sixth clock signal, respectively, the shift-register arrangement consists of two shift-register subarrangements each of which has n parallel shift registers providing a delay of one line period, the serial inputs of the first shift-register subarrangement are connected to the outputs of the first buffer memory, and the clock inputs of this subarrangement are fed with the sixth clock signal, the serial inputs of the second shift-register subarrangement are connected to the outputs of the second buffer memory, and the clock inputs of this subarrangement are fed with the fifth clock signal, the fourth binary arithmetic stage forms the mean of the input signals and the output signals of the second shift-register subarrangement, and the fifth binary arithmetic stage subtracts the input signals of the first shift-register subarrangement from the output signals of this subarrangement.

8. A color-television receiver as claimed in claim 6 incorporating R-G-B control of the picture tube, wherein an eighth binary arithmetic stage multiplying the output signal of the third binary arithmetic stage by a binary color-saturation control signal is connected between the outputs of the third binary arithmetic stage and the parallel inputs of the buffer-memory arrangement, and the three digital-to-analog converters are fed with a binary brightness control signal.

*9. An arrangement for producing from a composite color analog signal, a plurality of color information digital signals, said arrangement comprising:*

*means responsive to said analog signal for generating first digital signals having a predetermined relationship carried by said composite color analog signals; and*

*means for processing said first digital signals to generate said color information digital signals, said processing means comprises: means responsive to control signals and to said first digital signals for generating intermediate digital signals; and first processing means for processing said intermediate digital signals to generate said color information digital signals, said first processing means comprises first means for generating first ones of said plurality of color information digital signals by acting on a first set of said intermediate digital signals and a second set of said intermediate digital signals in a predetermined manner, said first set and second successive set of said intermediate digital signals being successive sets of said intermediate digital signals.*

*10. An arrangement in accordance with claim 9, wherein said first means generates said first ones of said plurality of color information digital signals by forming the arithmetic means of said first and second sets of said intermediate digital signals.*

*11. An arrangement in accordance with claim 10, wherein said first ones of said plurality of color information digital signals represent luminance signal information.*

*12. An arrangement for producing from a composite color analog signal, a plurality of color information digital signals, said arrangement comprising:*

*means responsive to said analog signal for generating first digital signals having a predetermined relationship to information carried by said composite color analog signals; and*

*means for processing said first digital signals to generate said color information digital signals, said processing means comprising: first processing means for generating first ones of said color information digital signals in response to said first digital signals, and second processing means for generating other ones of said color information digital signals in response to said first digital signals and said first ones of said color information digital signals.*

*13. An arrangement in accordance with claim 12, wherein said first ones of said color information digital signals represent luminance signals and said other ones of said color information digital signals represent first and second chrominance signals.*

*14. An arrangement in accordance with claim 13, wherein said first digital signal generating means comprises means for generating said first digital signals at a predetermined rate relative to the chrominance subcarrier of said composite color analog signal.*

*15. An arrangement in accordance with claim 14, wherein said predetermined rate is at least twice the frequency of said chrominance subcarrier.*

*16. An arrangement in accordance with claim 15, wherein said first processing means generates said first ones*

*of said color information signals in accordance with the means of the values represented by two successive sets of said first digital signals.*

*17. An arrangement in accordance with claim 16, wherein said second processing means generates said other ones of said color information digital signals by subtracting said first ones of said color information digital signals from said first digital signals.*

*18. An arrangement in accordance with claim 17, comprising means interposed between said digital signal generating means and said processing means for modifying said first digital signals in accordance with control signals.*

*19. A circuit arrangement for recovering video color signals from a composite color analog signal, said circuit arrangement comprising:*

*an analog to digital converter having inputs for receiving said composite color analog signal and for forming first digital signals representative of the amplitude of said composite color analog signal at predetermined time intervals at first outputs;*

*a delay circuit having inputs coupled to said analog to digital converter and first and second outputs;*

*a first digital circuit having first inputs coupled to said analog to digital converter first outputs and a second input coupled to said delay circuit second output and generating first color information digital signals at first outputs;*

*a second digital circuit having first inputs coupled to said first digital circuit first outputs and second inputs coupled to said delay circuit first outputs and generating first and second color difference digital signals at outputs.*

*20. A circuit arrangement in accordance with claim 19, comprising a third digital circuit coupled between said analog to digital converter and said delay circuit for receiving said first digital signals from said analog to digital converter, modifying said first digital signals in accordance with control signals and supplying said modified first digital signals to said delay circuit inputs.*

*21. A circuit arrangement in accordance with claim 20, comprising a third digital circuit coupled to the outputs of said second digital circuit, and responsive to said first and second color difference signals for generating a third color difference signal at outputs.*

*22. A circuit arrangement in accordance with claim 21, comprising: a binary R-G-B matrix having inputs coupled to said first digital circuit output, to said second digital circuit outputs, and to said third digital circuit outputs, for generating R, G and B digital outputs.*

*23. A circuit arrangement in accordance with claim 22, comprising:*

*digital to analog converter means coupled to said R, G and B digital outputs for generating R, G and B analog signals.*

* * * * *